(12) United States Patent
Wong et al.

(10) Patent No.: US 12,632,925 B2
(45) Date of Patent: May 19, 2026

(54) PARAMETER-EFFICIENT AND RESOLUTION-ROBUST NETWORK ARCHITECTURES FOR IMAGE-TO-IMAGE TRANSLATION

(71) Applicant: International Business Machines Corporation, Armonk, NY (US)

(72) Inventors: Chun Lok Wong, San Jose, CA (US); Hongzhi Wang, Santa Bruno, CA (US); Tanveer F. Syeda-Mahmood, Cupertino, CA (US); Levente Klein, Tuckahoe, NY (US); Ademir Ferreira Da Silva, Sao Paulo (BR); Jitendra Singh, Noida (IN)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 18/216,898

(22) Filed: Jun. 30, 2023

(65) Prior Publication Data

US 2025/0005710 A1 Jan. 2, 2025

(51) Int. Cl.
*G06T 3/4084* (2024.01)
*G06T 7/174* (2017.01)

(52) U.S. Cl.
CPC ............ *G06T 3/4084* (2013.01); *G06T 7/174* (2017.01); *G06T 2207/20056* (2013.01); *G06T 2207/20081* (2013.01); *G06T 2207/20084* (2013.01)

(58) Field of Classification Search
CPC .............................. G06T 3/4084; G06T 7/174
See application file for complete search history.

(56) References Cited

U.S. PATENT DOCUMENTS

| | | | |
|---|---|---|---|
| 2018/0247201 A1 | 8/2018 | Liu et al. | |
| 2021/0004681 A1* | 1/2021 | Tate ...................... | G06N 3/086 |
| 2022/0008019 A1* | 1/2022 | Jones ................. | A61B 5/02427 |
| 2022/0058803 A1 | 2/2022 | Bhattacharya et al. | |
| 2022/0067441 A1 | 3/2022 | Zhang et al. | |
| 2022/0101494 A1* | 3/2022 | Mardani Korani ... | G06T 3/4084 |

(Continued)

FOREIGN PATENT DOCUMENTS

| | | |
|---|---|---|
| CN | 114723004 A | 7/2022 |
| KR | 1020220124643 A | 9/2022 |

OTHER PUBLICATIONS

Chen, Wenlin et al, Compressing Convolutional Neural Networks in the Frequency Domain, Jun. 14, 2015 (Year: 2015).*

(Continued)

*Primary Examiner* — Kevin Ky
(74) *Attorney, Agent, or Firm* — Anthony Curro

(57) ABSTRACT

One embodiment provides a method of using a computing device for image-to-image translation including accessing an image file containing a first amount of data. The computing device inputs the image file into a convolutional neural network (CNN). The CNN includes multiple Fourier layers. Each Fourier layer includes a Fourier transform, a linear feature transformation in a frequency domain and an inverse Fourier transform. Each linear feature transformation in the frequency domain is shared by different frequency components to reduce a number of parameters. The CNN outputs an output image file that includes contents that are translated from the input image file.

15 Claims, 4 Drawing Sheets

(56) References Cited

U.S. PATENT DOCUMENTS

| | | |
|---|---|---|
| 2022/0269906 A1 | 8/2022 | Takeda et al. |
| 2023/0066220 A1 | 3/2023 | Coulombe et al. |
| 2024/0129380 A1* | 4/2024 | Ganju ................. G06F 11/3062 |
| 2024/0298995 A1* | 9/2024 | Flexman ................... A61B 6/06 |
| 2024/0312230 A1* | 9/2024 | Kumar ................... G06V 10/82 |
| 2025/0005710 A1* | 1/2025 | Wong ....................... G06N 3/08 |
| 2025/0022124 A1* | 1/2025 | Morard ................. G06T 3/4053 |
| 2025/0155389 A1* | 5/2025 | Kim ..................... G06N 3/0895 |

OTHER PUBLICATIONS

Huang, Gao et al, Densely Connected Convolutional Networks, Jan. 28, 2018 (Year: 2018).*

Rippel, Oren et al, Spectral Representations for Convolutional Neural Networks, 2015 (Year: 2015).*

Kelkar, S. et al., "SqueezeGAN: image to image translation with minimum parameters", 2018 International Joint Conference on Neural Networks (IJCNN), Jul. 8, 2018, pp. 1-6, IEEE, United States.

Xie, T., et al., "CoTr: Efficiently Bridging CNN and Transformer for 3D Medical Image Segmentation", In Medical Image Computing and Computer Assisted Intervention—MICCAI 2021: 24th International Conference, Sep. 27-Oct. 1, 2021, pp. 171-180, Proceedings, Part III 24, Springer International Publishing, Strasbourg, France.

Gurbuz, M.B., et al., "NISPA: Neuro-Inspired Stability-Plasticity Adaptation for Continual Learning in Sparse Networks", Proceedings of the 39th International Conference on Machine Learning, 2022, p. 1-18, United States.

Hatamizadeh, A., et al., "UNETR: Transformers for 3D Medical Image Segmentation", In Proceedings of the IEEE/CVF winter conference on applications of computer vision, 2022, pp. 574-584, IEEE Xplore, United States.

Gao, Y., et al., "UTNet: A Hybrid Transformer Architecture for Medical Image Segmentation", In Medical Image Computing and Computer Assisted Intervention—MICCAI 2021: 24th International Conference, Sep. 27-Oct. 1, 2021, pp. 61-71, Proceedings, Part III 24, Springer International Publishing, Strasbourg, France.

Li, Z., et al., "Fourier Neural Operator for Parametric Partial Differential Equations", arXiv preprint arXiv:2010.08895, Oct. 18, 2020, pp. 1-16, United States.

Grace Period Disclosure: Wong, Ken C.L. et al., "Image-Based Soil Organic Carbon Estimation from Multispectral Satellite Images with Fourier Neural Operator and Structural Similarity", Dec. 9, 2022, pp. 1-6, Neural Information Processing Systems (NeurIPS) 2022 Workshop of Tackling Climate Change with Machine Learning, New Orleans Convention Center, New Orleans, Louisiana.

Grace Period Disclosure: Wong, Ken C.L. et al., "FNOSEG3D: Resolution-Robust 3D Image Segmentation With Fourier Neural Operator", Apr. 18-21, 2023, pp. 1-5, IEEE International Symposium on Biomedical Imaging (ISBI 2023), Cartagena de Indias, Colombia.

* cited by examiner

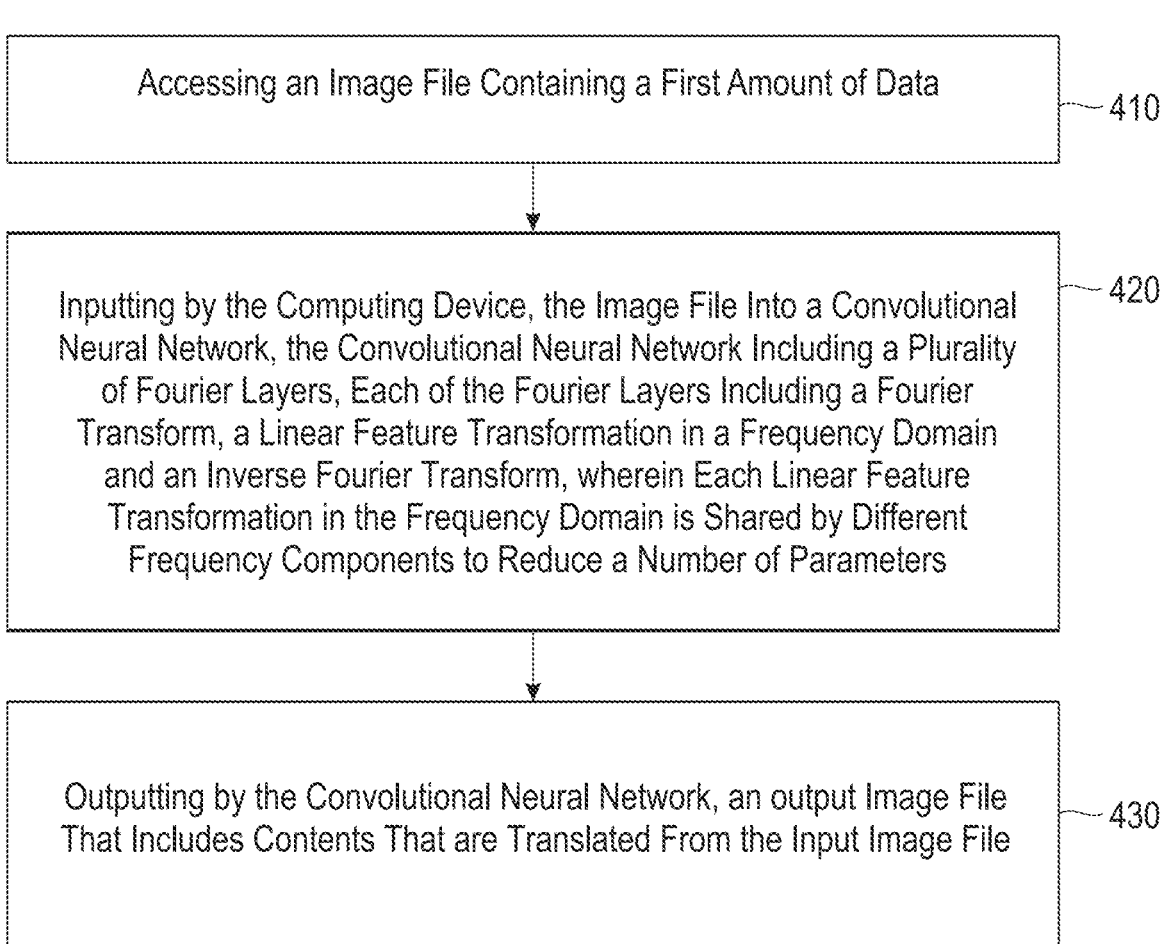

400

Accessing an Image File Containing a First Amount of Data ⌐ 410

Inputting by the Computing Device, the Image File Into a Convolutional Neural Network, the Convolutional Neural Network Including a Plurality of Fourier Layers, Each of the Fourier Layers Including a Fourier Transform, a Linear Feature Transformation in a Frequency Domain and an Inverse Fourier Transform, wherein Each Linear Feature Transformation in the Frequency Domain is Shared by Different Frequency Components to Reduce a Number of Parameters ⌐ 420

Outputting by the Convolutional Neural Network, an output Image File That Includes Contents That are Translated From the Input Image File ⌐ 430

FIG. 4

PARAMETER-EFFICIENT AND RESOLUTION-ROBUST NETWORK ARCHITECTURES FOR IMAGE-TO-IMAGE TRANSLATION

STATEMENT REGARDING PRIOR DISCLOSURES BY THE JOINT INVENTORS

The following disclosures are submitted under 35 U.S.C. 102(b)(1)(A):

DISCLOSURE: "Image-Based Soil Organic Carbon Estimation from Multispectral Satellite Images with Fourier Neural Operator and Structural Similarity", Ken C. L. Wong, Hongzhi Wang, Levente Klein, Jitendra Singh, Ademir Ferreira da Silva and Tanveer Syeda-Mahmood, Dec. 9, 2022, Neural Information Processing Systems (NeurIPS) 2022 Workshop of Tackling Climate Change with Machine Learning, New Orleans Convention Center, New Orleans, Louisiana.

DISCLOSURE: "FNOSEG3D: RESOLUTION-ROBUST 3D IMAGE SEGMENTATION WITH FOURIER NEURAL OPERATOR", Ken C. L. Wong, Hongzhi Wang, Tanveer Syeda-Mahmood, Apr. 18-21, 2023, IEEE International Symposium on Biomedical Imaging (ISBI 2023), Cartagena de Indias, Colombia.

BACKGROUND

The field of embodiments of the present invention relates to using a convolutional neural network (CNN) for image-to-image translation, machine learning parameter usage, and machine learning loss function optimization.

SUMMARY

Embodiments relate to using a convolutional neural network (CNN) for image-to-image translation. One embodiment provides a method of using a computing device for image-to-image translation including accessing an image file containing a first amount of data. The computing device inputs the image file into a CNN. The CNN includes multiple Fourier layers. Each Fourier layer includes a Fourier transform, a linear feature transformation in a frequency domain and an inverse Fourier transform. Each linear feature transformation in the frequency domain is shared by different frequency components to reduce a number of parameters. The CNN outputs an output image file that includes contents that are translated from the input image file.

A computer system and a computer program product configured to perform the above-described method are also disclosed herein.

These and other features, aspects and advantages of the present embodiments will become understood with reference to the following description, appended claims and accompanying figures.

BRIEF DESCRIPTION OF THE DRAWINGS

FIG. 4 illustrates a process for using a computing device to perform image-to-image translation with a CNN, according to an embodiment.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to using a convolutional neural network (CNN) for image-to-image translation. One embodiment provides a method of using a computing device for image-to-image translation including accessing an image file containing a first amount of data (that may be large). The computing device inputs the image file into a CNN. The CNN includes multiple Fourier layers. Each Fourier layer includes a Fourier transform, a linear feature transformation in a frequency domain and an inverse Fourier transform. Each linear feature transformation in the frequency domain is shared by different frequency components to reduce a number of parameters. The CNN outputs an output image file that includes contents that are translated from the input image file.

To address the limitations of conventional systems, some embodiments introduce a Fourier neural operator (FNO)-based three-dimensional (3D) segmentation model (FNOSeg3D), which is a 3D segmentation model that is robust to training image resolution. The model is a deep learning framework which uses a Fourier neural operator for learning mappings between functions in partial differential equations (PDEs), and which has the appealing properties of zero-shot super-resolution and global receptive field. One embodiment of the present disclosure reduces parameter requirements and enhances learning capability through residual connections and deep supervision, and these result in the FNOSeg3D model, which is parameter efficient and resolution robust. When tested, the FNOSeg3D model achieved superior robustness to training image resolution than other tested conventional models with less than 1% of their model parameters. In some embodiments, the FNOSeg3D model provides accurate results when applied on images with higher resolutions than the training images (i.e., zero-shot super-resolution). This model is a deep learning model that learns mappings between functions in PDEs. In one embodiment, the model performs computationally expensive 3D medical image segmentation. This results in a resolution-robust 3D segmentation model that has orders of magnitude fewer parameters than most deep learning 3D segmentation models.

Figure 1:
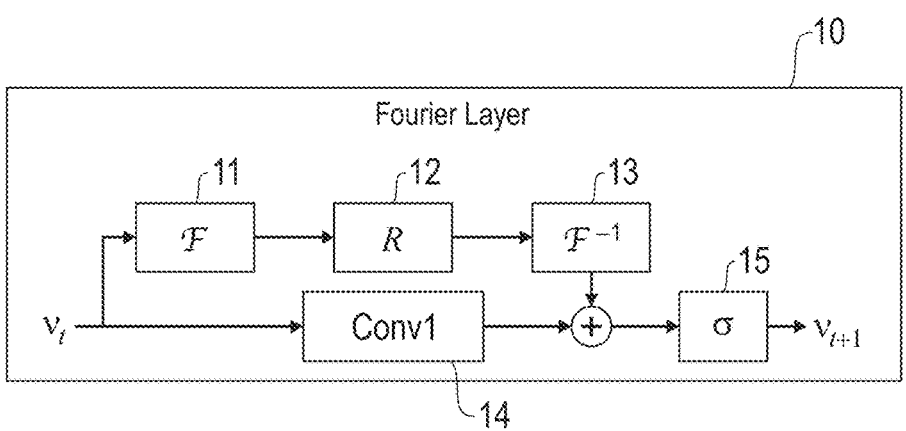
FIG. 1 illustrates a deep learning representation of a Fourier layer utilized by the disclosed technology, according to one embodiment.

FIG. 1 illustrates a deep learning representation of a Fourier layer 10 utilized by the disclosed technology, according to one embodiment. The Fourier layer 10 includes Fourier transform $\mathcal{F}$ 11, linear transform on the lower-frequency components R 12, inverse Fourier transform $\mathcal{F}^{-1}$ 13, convolution with kernel size 1 and stride 1 Conv1 14, normalization and activation function σ 15, input $v_t$ and output $v_{t+1}$. The top path of the Fourier layer 10 relates to the kernel integral operator K. The bottom path of the Fourier layer 10 relates to the linear transformation W which is represented as Conv1 14 in FIG. 1. The top path facilitates learning in the frequency domain while the bottom path facilitates learning in the spatial domain.

In some embodiments, the FNOSeg3D model is a deep learning model used to learn mappings between functions in PDEs without knowing the actual PDEs. As the FNOSeg3D formulations were developed based on Green's function in the continuous space, the FNOSeg3D model is configured for learning a single set of network parameters that may be used with different resolutions. Such zero-shot super-resolution capability is desirable for computationally demanding 3D image segmentation as a model trained with lower-resolution images can be applied on higher-resolution images with decent accuracy. The neural operator is formulated as iterative updates:

$$v_{t+1}(x) := \sigma(Wv_t(x) + (\mathcal{K}v_t)(x)) \text{ with} \qquad \text{Eq. (1)}$$

$$(\mathcal{K}v_t)(x) := \int_D \kappa(x-y)v_t(y)d_y, \forall x \in D$$

where v $$v_t(x) \in \mathbb{R}^{d_{v_t}}$$

is a function of x.

$$W \in \mathbb{R}^{d_{v_{t+1}} \times d_{v_t}}$$

is a learnable linear transformation and the function σ15 accounts for normalization and activation. $D \subset \mathbb{R}^3$ represents the 3D imaging space, and $v_t(x)$ are the outputs of hidden layers with $d_{v_t}$ channels. $\mathcal{K}$ is the kernel integral operator with $$\kappa \in \mathbb{R}^{d_{v_{t+1}} \times d_{v_t}}$$

being a learnable kernel function. As $(\mathcal{K}v_t)(x)$ is a convolution operator, its efficiency can be improved by applying the convolution theorem, which states that the Fourier transform $\mathcal{F}$ 11 of a convolution of two functions is the pointwise product of their Fourier transforms:

$$(\mathcal{K}v_t)(x) = \mathcal{F}^{-1}(\mathcal{F}(\kappa)\cdot\mathcal{F}(v_t))(x) \qquad \text{Eq. (2)}$$

$$= \mathcal{F}^{-1}(R\cdot(\mathcal{F}v_t))(x), \forall x \in D$$

where $$R(k) \in \mathbb{C}^{d_{v_{t+1}} \times d_{v_t}}$$

is a learnable function in the Fourier domain and $$(\mathcal{F}v_t)(k) \in \mathbb{C}^{d_{v_t}}.$$

As the fast Fourier transform is used in implementation, k are integers, and each k has a learnable R(k). In some embodiments, only $k_i \le k_{max,i}$ corresponding to the lower frequencies in each dimension i are used to reduce model parameters and computation time. x represents coordinates in a two dimensional or three dimensional domain D. Variable y is a dummy variable which means that it disappears after integration. The V means "for any" so that $\forall x$ is read as "for any x in D".

Figure 2:
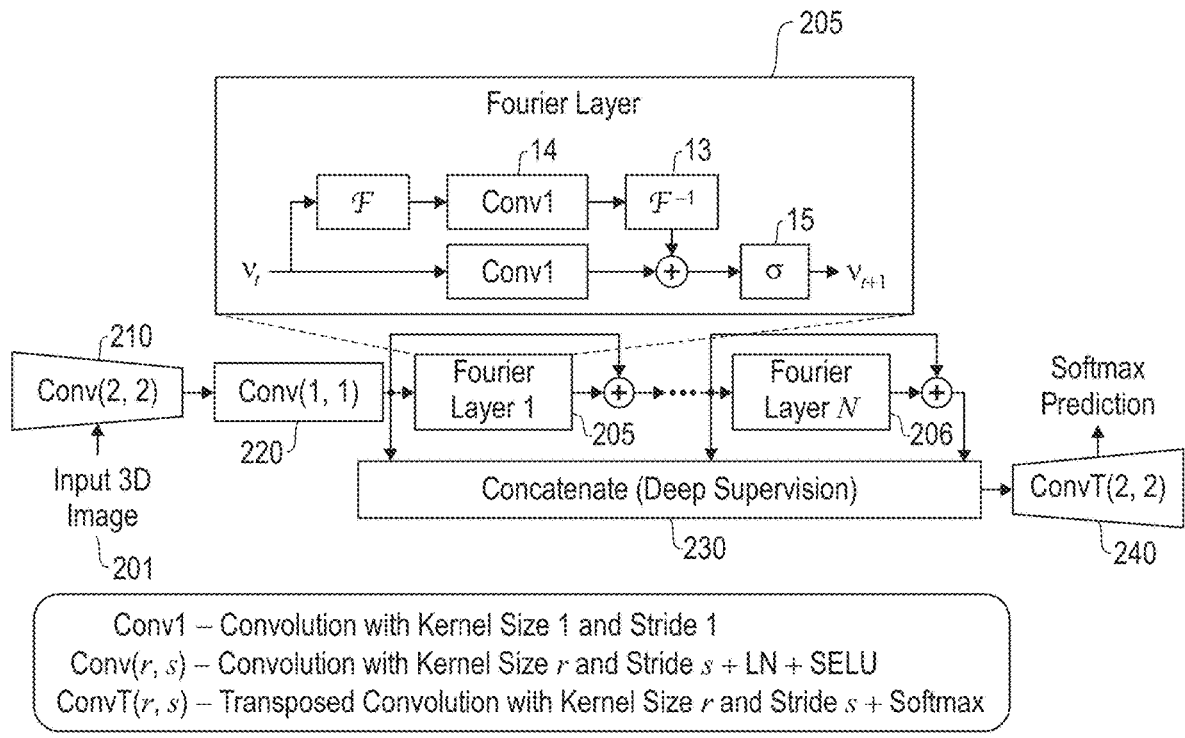
FIG. 2 illustrates a network architecture of a Fourier neural operator (FNO)-based three-dimensional (3D) segmentation model (FNOSeg3D), according to one embodiment.

FIG. 2 illustrates a network architecture of a Fourier neural operator (FNO)-based three-dimensional (3D) segmentation model (FNOSeg3D), according to one embodiment. In at least some embodiments the same (shared) R(k) is used for all k to significantly reduce the number of parameters and improve the accuracy suffered from over-parameterization. This sharing is equivalent to 3D convolution with a kernel size of one in the Fourier domain with complex numbers. Furthermore, residual connections and deep supervision are used to improve the training stability, convergence, and accuracy. As the batch size is usually small because of the large memory requirement for 3D segmentation, layer normalization (LN) is used. The scaled exponential linear unit (SELU) is used as the activation function, and the softmax function is used to produce the final prediction scores. As shown, the modified Fourier layer 205 replaces R 12 (FIG. 1) with Conv1 14 and embodies the aspect that each linear feature transformation in the frequency domain is shared by different frequency components to reduce a number of parameters.

In some embodiments, as the spatial integration in Eq. (1) realized by the Fourier transform provides a global receptive field as all voxels are used to compute the value at each k, pooling is not required in the network architecture. Using original image resolution usually results in out of memory errors in 3D segmentation. Therefore, downsampling the inputs and then upsampling the predictions are usually required. Instead of using traditional image resampling methods, some embodiments use a convolutional layer with the kernel size and stride of two (Conv(2, 2) 210) directly after the input layer (Input 3D image 201) (so that output of 201 is input directly into 210), and replaces the final output convolutional layer by a transposed convolutional layer with the kernel size and stride of two (ConvT(2, 2) 240). This transposed convolutional layer 240 may be referred to as an output transposed convolutional layer for output upsampling. In this way, the model learns the optimal resampling approach. All these modifications result in the simple yet powerful architecture of the FNOSeg3D model. In some embodiments, Conv(1, 1) 220 receives the output from Conv(2, 2) 210. The architecture of the FNOSeg3D model further includes that the results from the Fourier layer 1 205 to Fourier layer N 206 are received by concatenate processing 230 for which the results are received by ConvT(2, 2) 240.

In some embodiments, the PCC loss ($L_{PCC} \in [0,1]$) is used as it is robust to learning rate and accurate for image segmentation, and it consistently outperformed the conventional methods. In one or more embodiments, the $L_{PCC}$ is computed as:

$$L_{PCC} = E[1 - PCC_l] \qquad \text{Eq. (3)}$$

$$PCC_l = 0.5 \left( \frac{\sum_{i=1}^{N} (p_{li} - \overline{p}_l)(y_{li} - \overline{y}_l)}{\sqrt{\left(\sum_{i=1}^{N} (p_{li} - \overline{p}_l)^2\right)\left(\sum_{i=1}^{N} (y_{li} - \overline{y}_l)^2\right) + \epsilon}} + 1 \right) \qquad \text{Eq. (4)}$$

with E[•] being the mean value across semantic labels l. In some embodiments, $p_{li} \in [0,1]$ are the prediction scores, $y_{li} \in \{0,1\}$ are the ground-truth values, and N is the number of voxels in an image. In one or more embodiments, $\epsilon$ is a small positive number (e.g., $10^{-7}$) to avoid the divide-by-zero situations, for example, when label/is missing in an image and all $y_{li}=0$. Therefore, $L_{PCC}=0$, 0.5, and 1 represent perfect prediction, random prediction, and total disagreement, respectively. As the means are subtracted from the samples in Eq. (4), both scores of the foreground and background voxels of each label contribute to $L_{PCC}$. Hence, a low $L_{PCC}$ is achievable only if both foreground and background are well classified.

In one or more embodiments, as shown in FIG. 2, for each Fourier layer (205, 206), the output from a Fourier layer is added with the input to that layer. This is the residual connection. Concatenate processing 230 combines the features from the Fourier layers together and sends the results to the final convolutional layer 240 (deep supervision).

In some embodiments, for multimodal data, the images of different modalities are stacked along the channel axis to provide a multi-channel input. Image normalization is performed on each image of each modality as the intensity ranges across modalities can be quite different. Image augmentation with rotation (axial, ±30°), shifting (±20%), and scaling ([0.8, 1.2]) is used and each image has an 80% chance to be transformed. In some embodiments, the Adamax optimizer is used with the cosine annealing learning rate scheduler, with the maximum and minimum learning rates as $10^{-2}$ and $10^{-3}$, respectively. Note that small batch sizes are common in 3D segmentation given the large memory requirement.

In some embodiments, by using zero-shot super-resolution and global receptive field properties, the FNOSeg3D model that is trained with lower-resolution images can be applied to higher-resolution images with small reductions in accuracy. Furthermore, with the enhancement of shared weights, residual connections, and deep supervision, decent accuracy is achieved with surprisingly small numbers of model parameters. These advantages are desirable to the computationally intensive 3D image segmentation processing. Given its relatively simple network architecture, the FNOSeg3D model can be combined with other deep learning techniques for further improvements.

One or more embodiments achieve a reduction of the parameter requirement, and enhance its learning capability by residual connections, deep supervision, and the PCC loss. Together with the properties of zero-shot super-resolution and global receptive field, the FNOSeg3D model is parameter efficient and robust to training image resolution. Experimental results show that the FNOSeg3D model can achieve similar performance as traditional methodology and transformer-enhanced segmentation models when trained with high-resolution images, and can have superior performance when trained with low-resolution images.

Figure 3:
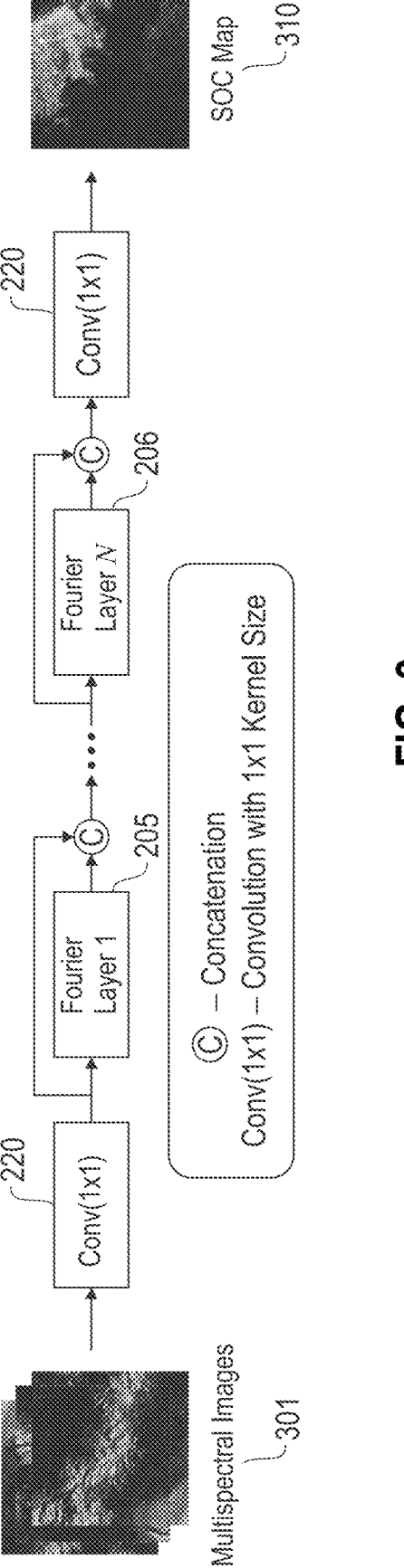
FIG. 3 illustrates a FNO-based densely connected convolutional network (FNO-DenseNet) where multispectral images are stacked as multi-channel inputs, according to one embodiment.

FIG. 3 illustrates a FNO-based densely connected convolutional network (FNO-DenseNet) model 300 where multispectral images 301 are stacked as multi-channel inputs, according to one embodiment. As shown, the multispectral images 301 are input to the Conv(1×1) 220. The output from Conv(1×1) 220 is received by the Fourier layer 1 205. The output from each Fourier layer is concatenated with the input to that layer and the result of the concatenation is passed to the next layer which is an example of the layers being densely connected. The output from the Fourier layer N 206 is concatenated and received by the Conv(1×1) 220 before output as the soil organic carbon (SOC) map 310. In one embodiment, SOC remote sensing from satellite images includes: satellite images of six spectral bands→soil organic carbon mapping, Fourier layers with shared R, DenseNet connections for improved accuracy and a loss function: mean absolute error (MAE)+structural similarity (used during training). The mean absolute error processing and structural similarity are implemented in the loss function that is applied to the output of the FNO-DenseNet, i.e., to the output from Conv (1×1) 220. In at least some embodiments the loss function is applied only to the output of the FNO-DenseNet.

In one embodiment, in the FNO-DenseNet model 300 multispectral images 301 are stacked as multi-channel inputs. The Fourier layers (Fourier layer 1 205 to Fourier layer N 206) are implemented by a fast Fourier transform. Estimating SOC at a global scale is a challenging task due to variability in soils, complex biochemical processes, and different management practices. Traditionally, soil is sampled at different depths and lab analyzed to measure SOC, but manual sampling is impractical to monitor SOC changes at a global scale. In contrast, satellite data can provide a complementary, scalable, and cost-effective alternative. Remote sensing through satellites has the potential to enable measurement, reporting, and verification of SOC across the globe, with year-to-year tracking of carbon storage and carbon cycle disruptions when carbon sequestration practices are implemented. In comparing FIG. 2 with FIG. 3, their respective Fourier layers are the same, i.e., with shared parameters in the frequency domain (205, FIG. 2; 210, FIG. 3). Conv(2, 2) 210 and ConvT(2, 2) 240 (FIG. 2) are unique to FNOSeg3D and do not exist in FNO-DenseNet. Furthermore, as the Fourier layers are densely connected in FNO-DenseNet, concatenate processing 230 (deep supervision) (FIG. 2) is unnecessary in the FNO-DenseNet model 300.

In some embodiments, MAE is used as the loss function as it outperformed the mean squared error. Nevertheless, it was found that using the MAE alone produced blurry predictions that lacked the structural details of the ground truths. This is most likely due to the texture-like appearances of the SOC data and the pixel-based MAE cannot account for the local dependencies among pixels. Therefore, in some embodiments the structural similarity (SSIM) is used, whose value ($\epsilon[-1, 1]$) between two non-negative images x and y is:

$$SSIM(x, y) = \frac{1}{M} \sum_{j=1}^{M} \frac{(2\mu_x\mu_y + C_1)(2\sigma_{xy} + C_2)}{(\mu_x^2 + \mu_y^2 + C_1)(\sigma_x^2 + \sigma_y^2 + C_2)}$$

where $C_1$ and $C_2$ are small constants to avoid dividing by zero. The means ($\mu_x$, $\mu_y$), variances $$(\sigma_x^2, \sigma_y^2),$$

and covariance ($\sigma_{xy}$) are computed from a local window j of size 11×11 pixels using a Gaussian weighting function with a standard deviation of 1.5 pixels. The SSIM compares the luminance, contrast, and structure between x and y. Combining with the MAE, the overall loss function is given as:

$$L = w \times MAE + 0.5 \times (1 - SSIM) = w \times MAE + DSSIM$$

where DSSIM=0.5×(1−SSIM)ϵ[0, 1] is the structural dissimilarity, and w is a scalar accounting for the difference in magnitude, which is 0.01 in our experiments.

As multispectral and hyperspectral satellite data can provide SOC related information such as vegetation, water, and soil properties, prediction and mapping of SOC using this data is an active research topic. Although the results are promising, most studies use pixel-based regression with traditional machine learning methods such as support vector machines (SVM) and random forests. Deep learning approaches, especially CNNs, are seldom used. In one or more embodiments, an image-based deep learning approach is used to estimate SOC from multispectral satellite imagery. In one embodiment, incorporating SSIM in the loss function further improves SOC estimation. The FNO-DenseNet model 300 outperformed the conventional FNO and had hundreds of times fewer parameters. The FNO-DenseNet model 300 also outperformed a conventional deep learning architecture (V-Net) and a pixel-based random forest (ensemble learning methodology for classification, regression, etc. using decision trees).

The FNO-DenseNet model 300 outperformed the conventional FNO, V-Net, and random forest with the least number of parameters among the neural networks. Furthermore, by using the DSSIM in the loss function, the learned models provide predictions with structural details like the ground truths. Given these advantages, the framework of one or more embodiments enable measurement, reporting, and verification of SOC across the globe to allow year-to-year tracking of carbon storage and carbon cycle disruptions when carbon sequestration practices are implemented.

FIG. 4 illustrates a process 400 for using a computing device and a CNN to perform image-to-image translation, according to an embodiment. In one embodiment, in block 410 process 400 accesses an image file where the image file contains a first amount of data, e.g., a large amount of data. In block 420, process 400 inputs the image file into a CNN. The CNN including multiple Fourier layers. Each of the multiple Fourier layers including a Fourier transform, a linear feature transformation in a frequency domain and an inverse Fourier transform. Each linear feature transformation in the frequency domain is shared by different frequency components to reduce a number of parameters. In block 430, process 400 outputs, by the CNN, an output image file that includes contents that are translated from the input image file. The output image file in some embodiments contains a second amount of data that is smaller than the first amount of data of the initial image file accessed in block 410. Thus, the process 400 achieves a reduction in size from the original input file. The final output is representative of the image represented in the initial image file accessed in block 410.

In one or more embodiments, process 400 may further include the feature that the Fourier layers include residual connections.

In some embodiments, the CNN implements deep supervision.

In one or more embodiments, process 400 may include the feature that the deep supervision comprises concatenation that combines features from the Fourier layers together and sends results of the concatenation to a final convolutional layer.

In some embodiments, process 400 may further include the feature that the CNN includes an output transposed convolutional layer for output upsampling.

In one or more embodiments, process 400 may further include training the CNN by performing MAE processing and SSIM processing are incorporated in a loss function.

In some embodiments, process 400 may include the feature that output from a first Fourier layer is concatenated with input to the first Fourier layer to form a dense output, and the dense output is input to a next Fourier layer of the multiple Fourier layers.

In one or more embodiments, process 400 may further include the feature that the mage file that is input to the CNN includes multispectral images stacked as multi-channel inputs.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
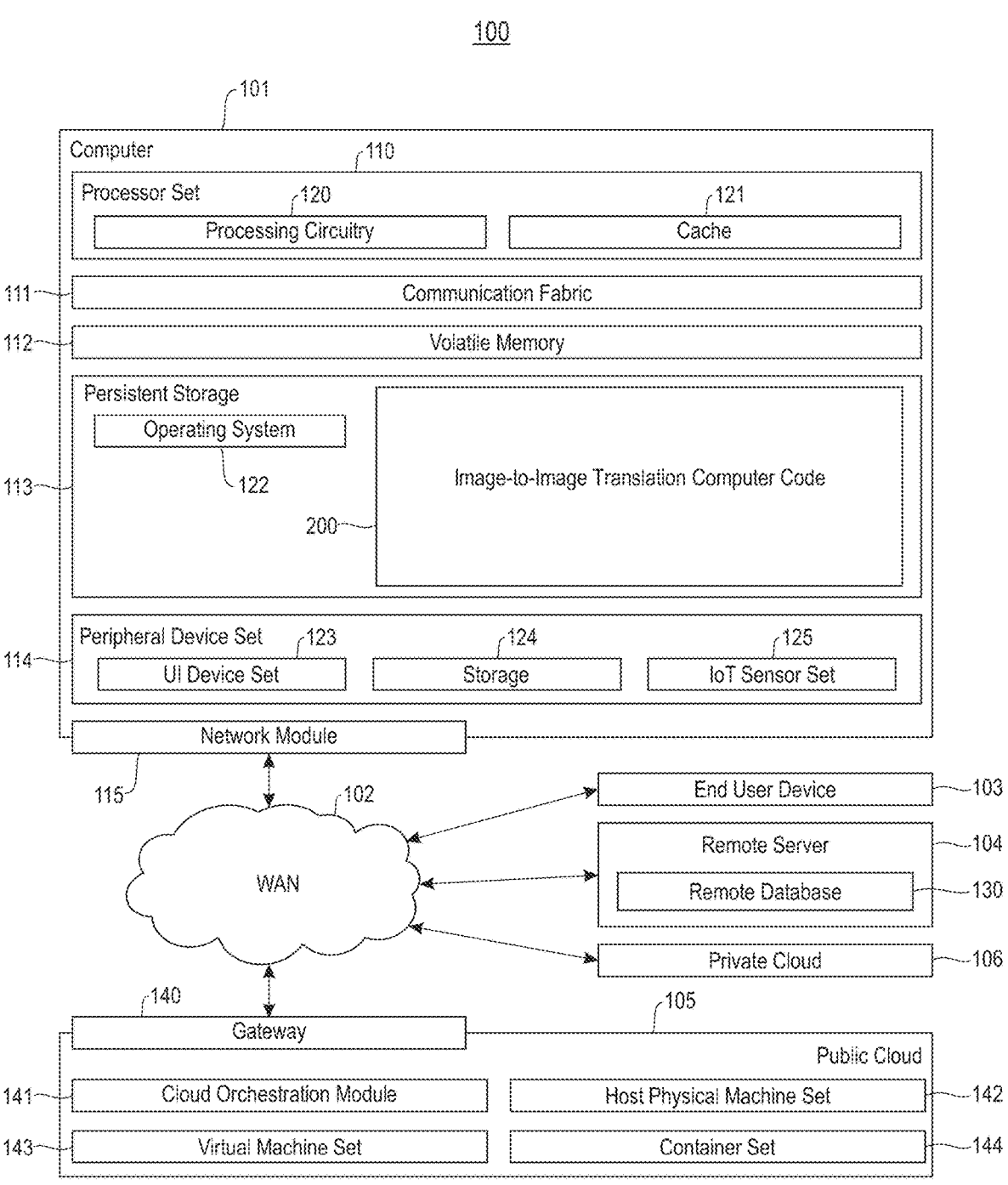
FIG. 5 illustrates an example computing environment utilized by one or more embodiments.

FIG. 5 illustrates an example computing environment 100 utilized by one or more embodiments. Computing environment 100 contains an example of an environment for the execution of at least some of the image-to-image translation computer code 200 involved in performing the inventive methods (such as FNOSeg3D model code, FNO-DenseNet model code, etc.). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method of using a computing device for image-to-image translation, the method comprising:

accessing an image file containing a first amount of data;

inputting by the computing device, the image file into a convolutional neural network, the convolutional neural network including a plurality of Fourier layers, each of the Fourier layers including a Fourier transform, a linear feature transformation in a frequency domain, and an inverse Fourier transform, wherein each linear feature transformation in the frequency domain is shared by different frequency components to reduce a number of parameters; and outputting by the convolutional neural network, an output image file that includes contents that are translated from the input image file, wherein the convolutional neural network implements deep supervision comprising concatenation that combines features from the Fourier layers together and sends a result of the concatenation to a final convolutional layer.

2. The method of claim 1, wherein the Fourier layers include residual connections.

3. The method of claim 1, wherein the convolutional neural network includes an output transposed convolutional layer for output upsampling.

4. The method of claim 1, further comprising training the convolutional neural network by performing mean absolute error processing and structural similarity processing incorporated in a loss function.

5. The method of claim 1, wherein output from a first Fourier layer of the Fourier layers is concatenated with input to the first Fourier layer to form a dense output and the dense output is input to a next Fourier layer of the Fourier layers.

6. The method of claim 1, wherein the image file that is input to the convolutional neural network comprises multispectral images stacked as multi-channel inputs.

7. A computer program product for providing a convolutional neural network for image-to-image translation, the computer program product comprising a computer readable storage medium having program instructions embodied therewith, the program instructions executable by a processor to cause the processor to:

access an image file containing a first amount of data;

input the image file into a convolutional neural network, the convolutional neural network including a plurality of Fourier layers, each of the Fourier layers including a Fourier transform, a linear feature transformation in a frequency domain, and an inverse Fourier transform, wherein each linear feature transformation in the frequency domain is shared by different frequency components to reduce a number of parameters; and output by the convolutional neural network, an output image file that includes contents that are translated from the input image file, wherein the convolutional neural network implements deep supervision comprising concatenation that combines features from the Fourier layers together and sends a result of the concatenation to a final convolutional layer.

8. The computer program product of claim 7, wherein the Fourier layers include residual connections.

9. The computer program product of claim 7, wherein the program instructions executable by the processor further cause the processor to:

train the convolutional neural network by performing mean absolute error processing and structural similarity processing incorporated in a loss function.

10. The computer program product of claim 7, wherein output from a first Fourier layer of the Fourier layers is concatenated with input to the first Fourier layer to form a dense output and the dense output is input to a next Fourier layer of the Fourier layers.

11. The computer program product of claim 7, wherein the image file that is input to the convolutional neural network comprises multispectral images stacked as multi-channel inputs.

12. A system comprising:

a memory configured to store instructions; and a processor configured to execute the instructions to:

access an image file containing a first amount of data;

input the image file into a convolutional neural network, the convolutional neural network including a plurality of Fourier layers, each of the Fourier layers including a Fourier transform, a linear feature transformation in a frequency domain, and an inverse Fourier transform, wherein each linear feature transformation in the frequency domain is shared by different frequency components to reduce a number of parameters; and output by the convolutional neural network, an output image file that includes contents that are translated from the input image file, wherein the convolutional neural network implements deep supervision and the deep supervision comprises concatenation that combines features from the Fourier layers together and sends a result of the concatenation to a final convolutional layer.

13. The system of claim 12, wherein the Fourier layers include residual connections.

14. The system of claim 12, wherein the processor is further configured to execute the instructions to:

train the convolutional neural network by performing mean absolute error processing and structural similarity processing incorporated in a loss function;

wherein the convolutional neural network includes an output transposed convolutional layer for output upsampling.

15. The system of claim 12, wherein output from a first Fourier layer of the Fourier layers is concatenated with input to the first Fourier layer to form a dense output, the dense output is input to a next Fourier layer of the Fourier layers, and the image file that is input to the convolutional neural network comprises multispectral images stacked as multi-channel inputs.

* * * * *